United States Patent
Iqbal et al.

(10) Patent No.: US 12,181,621 B1
(45) Date of Patent: *Dec. 31, 2024

(54) SYSTEM AND PROGRAM INSTRUCTIONS FOR SEISMIC SURVEY

(71) Applicant: KING FAHD UNIVERSITY OF PETROLEUM AND MINERALS, Dhahran (SA)

(72) Inventors: Naveed Iqbal, Dhahran (SA); Azzedine Zerguine, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/814,737

(22) Filed: Aug. 26, 2024

Related U.S. Application Data

(63) Continuation of application No. 17/689,461, filed on Mar. 8, 2022, now Pat. No. 12,111,435.
(Continued)

(51) Int. Cl.
*G01V 1/22* (2006.01)
*H04B 7/26* (2006.01)
*H04L 27/26* (2006.01)

(52) U.S. Cl.
CPC ........... *G01V 1/223* (2013.01); *H04B 7/2643* (2013.01); *H04L 27/2601* (2013.01)

(58) Field of Classification Search
CPC ........ G01V 1/223; G01V 1/22; H04B 7/2643; H04L 27/2601
See application file for complete search history.

(56) References Cited

U.S. PATENT DOCUMENTS

| | | | | |
|---|---|---|---|---|
| 9,276,795 | B2 * | 3/2016 | Vermani | H04L 5/0048 |
| 9,614,699 | B2 * | 4/2017 | Iqbal | H04L 25/03057 |
| 10,212,007 | B2 * | 2/2019 | Akande | H04L 27/01 |
| 10,432,438 | B2 * | 10/2019 | Akande | H04L 25/03159 |
| 10,439,849 | B2 * | 10/2019 | Akande | H04L 25/0305 |

(Continued)

FOREIGN PATENT DOCUMENTS

| | | | | |
|---|---|---|---|---|
| CA | 2980775 C | * | 12/2020 | H04H 20/38 |
| CN | 101470210 A | * | 7/2009 | G01V 1/00 |

(Continued)

OTHER PUBLICATIONS

Emanuel Staudinger, et al., "Swarm Technologies for Future Space Exploration Missions", Conference: 14th International Symposium On Artificial Intelligence, Robotics and Automation in Space (I-SAIRAS), Jun. 4, 2018, 14 pages.

(Continued)

*Primary Examiner* — Daniel Pihulic
(74) *Attorney, Agent, or Firm* — Oblon, McClelland, Maier & Neustadt, L.L.P.

(57) ABSTRACT

A system, computer-readable storage medium and method of reflection seismic survey in a wireless seismic network within a survey area is described. The method includes detecting, in each of a plurality of wireless seismic sensor nodes, seismic reflection signals from a seismic energy source; recording, in each of a plurality of wireless geophones, detected seismic signals; transmitting, by the geophones, the recorded seismic signals as digital data, using a combination of Orthogonal Frequency-Division Multiple Access (OFDMA) and Time Division Multiple Access (TDMA), to a central data receiving device; changing the seismic energy source location for seismic reflection; and repeating the detecting, recording and transmitting a number of times for each change in seismic energy source.

6 Claims, 9 Drawing Sheets

Related U.S. Application Data

(60) Provisional application No. 63/293,905, filed on Dec. 27, 2021.

(56) References Cited

U.S. PATENT DOCUMENTS

| | | | | |
|---|---|---|---|---|
| 11,460,594 | B1 * | 10/2022 | Iqbal | ........................ G01V 1/30 |
| 12,111,435 | B2 * | 10/2024 | Iqbal | .................... H04B 7/2643 |
| 2004/0105533 | A1 | 6/2004 | Iseli | |
| 2005/0114033 | A1 | 5/2005 | Ray et al. | |
| 2006/0291327 | A1 | 12/2006 | Barakat | |
| 2012/0134237 | A1 * | 5/2012 | Esteban-Campillo | ... G01V 1/00 367/136 |
| 2012/0290253 | A1 * | 11/2012 | Barrett | ..................... G01C 5/06 702/150 |
| 2017/0048088 | A1 * | 2/2017 | Iqbal | .................. H03H 17/0277 |
| 2017/0155498 | A1 * | 6/2017 | Akande | ............. H04L 25/03159 |
| 2019/0081830 | A1 * | 3/2019 | Akande | ............. H04L 27/26526 |
| 2019/0140874 | A1 * | 5/2019 | Akande | .................... H04L 27/01 |
| 2020/0217979 | A1 * | 7/2020 | Iqbal | ........................ G01V 1/366 |
| 2023/0204807 | A1 * | 6/2023 | Iqbal | ........................ G01V 1/22 |
| 2023/0327718 | A1 * | 10/2023 | Lawal | .................. H04B 7/0491 |
| 2023/0327745 | A1 * | 10/2023 | Lawal | .................. H04B 7/0854 |
| 2023/0328637 | A1 * | 10/2023 | Lawal | .................. H04B 7/0413 375/267 |

FOREIGN PATENT DOCUMENTS

| | | | | |
|---|---|---|---|---|
| CN | 108351430 | A * | 7/2018 | ............. G01V 1/226 |
| EP | 2664945 | A1 * | 11/2013 | ............. B64C 27/51 |
| JP | 6828003 | B2 * | 2/2021 | ........... H04L 5/0051 |
| WO | WO-2008033969 | A2 * | 3/2008 | ............... G01V 1/22 |
| WO | WO-2023239525 | A1 * | 12/2023 | ......... H04B 7/04013 |

OTHER PUBLICATIONS

Xiaopu Zhang, et al., "An Efficient Seismic Data Acquisition Based on Compressed Sensing Architecture With Generative Adversarial Networks", IEEE Access, vol. 7, Aug. 1, 2019, pp. 105948-105961.

Naveed Iqbal, "Energy Efficient Architecture for Wireless Geophone networks", SEG International Exposition and 89th Annual Meeting, Paper No. SEG-2019-3215665, Sep. 15, 2019, pp. 107-111.

Naveed Iqbal, et al., "Cross-Layer Design and Analysis of Wireless Geophone Networks Utilizing TV White Space", IEEE Access, vol. 8, Jun. 26, 2020, pp. 118542-118558.

Hussein Attia, et al., "Wireless Geophone Sensing System for Real-Time Seismic Data Acquisition", IEEE Access, vol. 8. Apr. 21, 2020, pp. 81116-81128.

* cited by examiner

SYSTEM AND PROGRAM INSTRUCTIONS FOR SEISMIC SURVEY

CROSS-REFERENCE TO RELATED APPLICATIONS

The present application is a Continuation of U.S. application Ser. No. 17/689,461, now allowed, having a filing date of Mar. 8, 2022, and claims the benefit of priority to U.S. provisional application No. 63/293,905 filed Dec. 27, 2021, the entire contents of which are incorporated herein by reference.

STATEMENT REGARDING PRIOR DISCLOSURE BY THE INVENTORS

Aspects of this technology are described in an article "OFDMA-TDMA-Based Seismic Data Transmission Over TV White Space," IEEE Communications Letters (May 2021). The article was published Jan. 18, 2021, and is herein incorporated by reference in its entirety.

STATEMENT OF ACKNOWLEDGEMENT

The author would like to acknowledge the support provided by the Deanship of Scientific Research (DSR) at King Fahd University of Petroleum & Minerals (KFUPM), Dhahran, Saudi Arabia, for funding this work.

BACKGROUND

Technical Field

The present disclosure is directed to a system, computer-readable storage medium and method of transmission of the seismic data based on a combination of OFDMA and TDMA schemes for seismic data acquisition systems. Channel parameters related to the OFDMA-TDMA scheme such as time slot and OFDMA sub-carriers assigned to a geophone can be hardwired. The OFDMA subcarriers and time shot assigned to a geophone match with data acquisition parameters, like bandwidth, sampling frequency, bits per sample, and trace (seismic data recorded by a geophone) duration of the seismic data.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A seismic survey is an important tool for exploring for subsurface mineral deposits, volcanic monitoring, landslide monitoring, monitoring of glaciers, underground tomography, and earthquake prediction. The seismic survey is performed by sending seismic waves into the deep subsurface of the Earth, and recording the reflected and refracted waves as seismic data. The acquisition of seismic data requires special devices such as vibration trucks and geophones. After processing and analyzing the acquired data, the seismic survey is configured to provide an insight into the geological structure of the Earth, without using any costly drilling method.

In a traditional approach, a network of sensors called "geophones" are deployed in a survey area that is connected to a center communication point via a cable for communicating data. However, this approach includes various disadvantages such as excess weight, reliability issues, complexities in deployment and maintenance, human resource costs, and other operational costs. Moreover, cables are prone to damage by stress, resulting in more frequent downtime of the seismic survey.

Oil and gas operators are focusing on increasingly complex hydrocarbon reservoirs that are often difficult to image. Such targets require increasing amounts of data in order to acquire the most accurate possible image of the subsurface. To meet the growing need and demand for massive volumes of data, geo-physical service companies are improving systems to provide more recording channels per survey.

Geo-physical service companies perform surveys utilizing a large number of wired geophones, for example on the order of 200,000 to over a million wired geophones.

In recent years, wireless seismic data acquisition systems have started to address an increased demand for better subsurface image quality data having low transmission time. The wireless system utilizes seismic sensor nodes equipped with wireless transceivers to form a network of wireless geophone sensors. However, the transmissions are made either directly between each wireless geophone and a control station or directly between each wireless geophone and a concentrator, which leads to congestion in the network and low transmission rate. For example, a land seismic exploration of 10,000 to 30,000 geophones, covering an area on the order of several square kilometers, has an average density of up to 2000 devices per $km^2$. That amount of traffic or connections in a survey is similar to what a telecommunication operator would handle if everyone in a low-populated city placed a call at substantially the same time.

Recently, wireless seismic network architectures have been proposed based on random access techniques, like Carrier Sense Multiple Access (CSMA)-based protocols. CSMA works well for a small network (local area) having few nodes. However, when it comes to a large regional area having a large number of nodes, transmission needs to be scheduled appropriately, requiring enhanced transmission time which results in reduced throughput. The rate at which data are generated by a geophone depends on the signal sampling interval/frequency and the resolution of the A/D converter used. For a survey with a minimum sample interval $T_s$ of 0.5 ms and a 24 bit A/D converter resolution, each geophone in the network will generate data at rate of 48 kbit/s. Data generated by geophones required to be transmitted to the center unit for each record or shot could be quite large. This can be quantified by an example survey that entails 30,000 geophones, with seismic signals sampled at 0.5 ms interval, 5 s geophone recording period, and a time lapse between records of 60 s. To keep up with this data throughput, multiple radio links are required to share the bandwidth load. This example survey with 30,000 geophones transmitting data in real-time will require a sum throughput of 1.44 Gbit/s per shot. Support for such throughput would be cause numerous problems for existing wireless sensor networks.

Accordingly, it is one object of the present disclosure to provide methods and wireless geophones for maximizing the throughput of the seismic survey for timely delivery of the seismic data from geophones to a data center.

SUMMARY

In an aspect, a method of reflection seismic survey is in a wireless seismic network within a survey area. The method includes detecting, in each of a plurality of wireless seismic sensor nodes, seismic reflection signals from a seismic energy source; recording, in each of the plurality of wireless seismic sensor nodes, the detected seismic reflection signals; transmitting, by the wireless seismic sensor nodes, the recorded seismic signals as seismic digital data, using a combination of Orthogonal Frequency-Division Multiple Access (OFDMA) and Time Division Multiple Access (TDMA), to a central data receiving device; changing the seismic energy source location for seismic reflection; and repeating the detecting, recording and transmitting a number of times for each change in seismic energy source.

In another aspect, a system having wireless seismic sensor nodes for reflection seismic survey use a wireless seismic network within a survey area of at least 20 km$^2$. Each of a plurality of the wireless seismic sensor nodes includes communications circuitry configured to detect seismic reflection signals from a seismic energy source; a memory for recording the detected reflection seismic signals; and the communications circuitry configured to transmit the recorded seismic signals as seismic digital data, using a combination of Orthogonal Frequency-Division Multiple Access (OFDMA) and Time Division Multiple Access (TDMA), to a central data receiving device, wherein the detecting, recording and transmitting is repeated a number of times upon changing the source location for the seismic reflection signals.

In another aspect, a non-transitory computer-readable storage medium stores instructions for reflection seismic survey in a wireless seismic network within a survey area. Processing circuitry, in each of a plurality of wireless seismic sensor nodes, executes the instructions according to a method including detecting, in each of a plurality of wireless seismic sensor nodes, seismic reflection signals from a seismic energy source; recording, in each of the plurality of wireless seismic sensor nodes, the detected seismic reflection signals; transmitting the recorded seismic signals as seismic digital data, using a combination of Orthogonal Frequency-Division Multiple Access (OFDMA) and Time Division Multiple Access (TDMA), to a central data receiving device; monitoring a change in the seismic energy source location for seismic reflection; and repeating the detecting, recording and transmitting a number of times for each change in seismic energy source.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
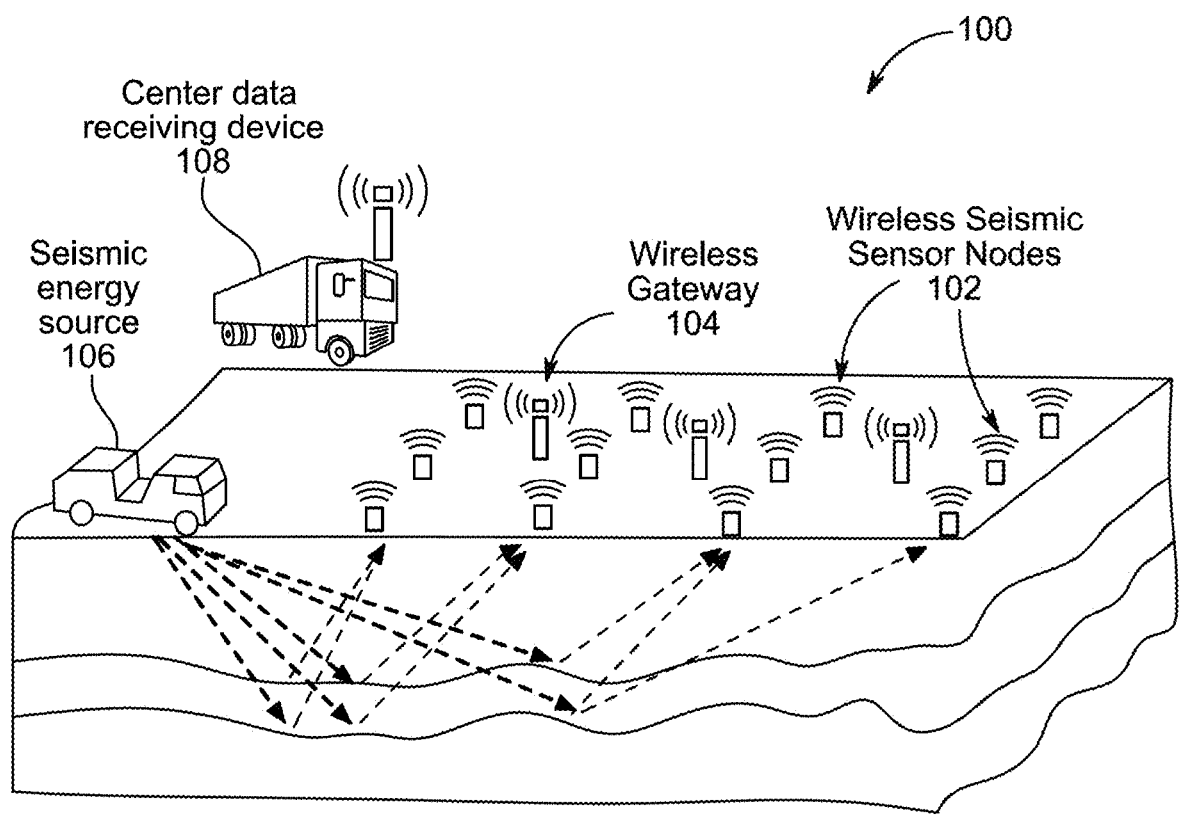
FIG. 1 is a perspective view of a wireless seismic network, according to aspects of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a method and wireless geophones for reflection seismic survey in a wireless seismic network within a survey area of substantially 20 km$^2$. In the present disclosure, an Orthogonal Frequency-Division Multiple Access (OFDMA) Time Division Multiple Access (TDMA) based seismic data acquisition system is used to achieve a desirable throughput, which ensures timely delivery of the seismic data from a large number of wireless geophones to a data center directly. In an OFDM-TDMA system, a whole OFDM symbol is assigned to one geophone. In the OFDMA-TDMA system, a sub-carrier in a OFDM symbol is assigned to a geophone and other sub-carriers to other geophones. In this way the system can accommodate a much larger number of geophones. In an embodiment, the OFDMA-TDMA system can support up to 136,800 geophones, by assigning 1440 data subcarriers and 95 time slots to geophones.

Further, the present disclosure utilizes Television (TV) white space (also known by acronym TVWS) for transmission to have long-distance links between the wireless geophones and the data center. Using the TV whitespace enables substantially removes or eliminates a requirement of having intermediate relays and thereby reducing the delivery time of the seismic data. It is evident from the present disclosure that a transmission time of seismic data per seismic shot is less than the transmission time achieved by the Carrier Sense Multiple Access (CSMA) technique. Furthermore, the use of TV white space and reduced transmission saves hardware cost and improves the seismic data delivery time.

The throughput and the transmission time expressions for the OFDMA-TDMA based seismic data acquisition system are derived considering a Markov chain model. The present disclosure helps design a wireless seismic network, in particular, to find the seismic shot interval time and the retransmissions attempt for a successful data transmission of a seismic shot.

In various aspects of the disclosure, non-limiting definitions of one or more terms that will be used in the document are provided below.

"TV white space" is an unutilized portion (or vacant channels) of a licensed radio spectrum in the ultra-high frequency (UHF) band between 470 and 690 MHZ assigned for television broadcast that may be used by secondary users in a geographical location. The TV white space may be unlicensed. However, for effective and efficient use of the TV whitespace radio spectrum the white space needs to be used in a controlled manner.

The term "seismic shot" may be defined as an event of initiation of seismic waves in the rocks or subsurface of the Earth by seismic energy source at a known point.

FIG. 1 describes a perspective view of a wireless seismic network (hereinafter interchangeably referred to as "the network 100"), according to aspects of the present disclosure.

Referring to FIG. 1, the wireless seismic network 100 includes a large number of wireless seismic sensor nodes 102, at least one wireless gateway 104, a seismic energy source 106, and a central data receiving device 108.

The seismic energy source 106 is configured to generate and broadcast radio signals (seismic signals) of predetermined frequencies towards the surface of the Earth. Due to different strata of the Earth, the broadcasted seismic signals are refracted and reflected. The seismic surveys are performed by using the refracted and reflected seismic signals. In some examples, the seismic energy source 106 may be a truck-mounted or buggy-mounted device that introduces seismic signals having vibrations/frequencies into the Earth. For example, the seismic energy source 106 may be a vibrator truck, an air gun, a thumper truck, a plasma sound source, and/or a seismic vibrator boomer source. In an aspect, the seismic energy source 106 may provide seismic signals having single pulses of frequencies or continuous sweeps of the frequencies.

The number of wireless seismic sensor nodes 102 (hereinafter interchangeably referred to as "wireless geophone 102") is configured to detect the reflected and/or refracted seismic signals and record the detected seismic signals. Each of the wireless geophones 102 mainly includes two main modules; namely, a data acquisition module and a communication module (not shown). The data acquisition module is configured to record the reflected and/or refracted seismic signals and process the recorded seismic signals to generate a seismic digital data. The communication module is used to communicate the seismic digital data to the at least one wireless gateway 104. In an aspect, the communication module may employ a smart reconfigurable antenna for communicating over the network 100. In an exemplary implementation, the network 100 may include fifty thousand (50,000) or greater wireless geophone nodes. Each of the wireless geophones 102 is configured to record the seismic signals detected in the proximity of each of the wireless geophone 102. In an aspect, the wireless geophone 102 is configured to transmit the seismic digital data using a combination of OFDMA and TDMA, to the central data receiving device 108.

In an embodiment, the at least one wireless gateway 104 may be configured to be communicatively coupled to the plurality of wireless geophones 102. The wireless gateway 104 may be configured to receive the seismic digital data from each wireless geophone 102 and transmit the received seismic digital data to the central data receiving device 108. To save power, the wireless gateway 104 may be configured to form a cluster of a number of wireless geophones and receive data from the geophones of the cluster. The wireless gateway 104 aggregates the received seismic digital data from the geophones of the cluster and transmits the aggregated data to the central data receiving device 108. In an embodiment, the wireless gateway 104 may be configured to transmit the received seismic digital data after a predetermined time interval or transmit the received seismic digital data continuously for the real time processing. In an embodiment, the wireless gateway 104 is configured to transmit the seismic digital data, received from the wireless geophones 102, using a combination of OFDMA and TDMA, to the central data receiving device 108. In an embodiment, the wireless gateway 104 is selected from a group consisting of a WAP gateway, an XML gateway, a HTML gateway, a CHTML gateway, a WML gateway, a Lora gateway, and a ZigBee gateway.

The central data receiving device 108 is configured to receive the transmitted seismic digital data from the wireless gateway 104 and process the received data by translating the received data into usable information. In some embodiments, the central data receiving device 108 may be placed within a defined range for receptivity, for example, 6 miles from the wireless gateway. In some embodiments, the central data receiving device 108 may be placed more or less than the defined range depending on aggregates such as noise, line of site and other aspects. In some embodiments, the central data receiving device 108 may be implemented in a mobile arrangement such as on a vehicle such as a truck. In some embodiments, the central data receiving device 108 is configured to perform various steps such as data preparation, data transformation, and data validation. In an embodiment, the central data receiving device 108 is configured to remove the errors introduced during data transmission. The central data receiving device 108 is further configured to store the processed data. The central data receiving device 108 is configured to store the location of each wireless geophones 102, the received corresponding seismic digital data and various other parameters such as depth at which wireless geophone 102 is placed, the time at which the wireless geophone was installed, time of arrival of seismic signals at the wireless geophone, etc. In an embodiment, the central data receiving device 108 may include a central processor, a memory, one or more storage devices, and input/output interfaces/devices. In some embodiments, the central data receiving device 108 may only perform storage function and interface with other systems for processing. In an embodiment, the central data receiving device 108 comprises an electronic computing device operable to receive, transmit, process, store, or manage data and information associated with the network 100.

The central data receiving device 108 includes an electronic circuit for filtering and amplification of the received seismic digital data. In an embodiment, the central data receiving device 108 is configured to perform signal denoising, detailed analysis, and based on the results of the analysis, a warning is provided to a corresponding authority.

Figure 2:
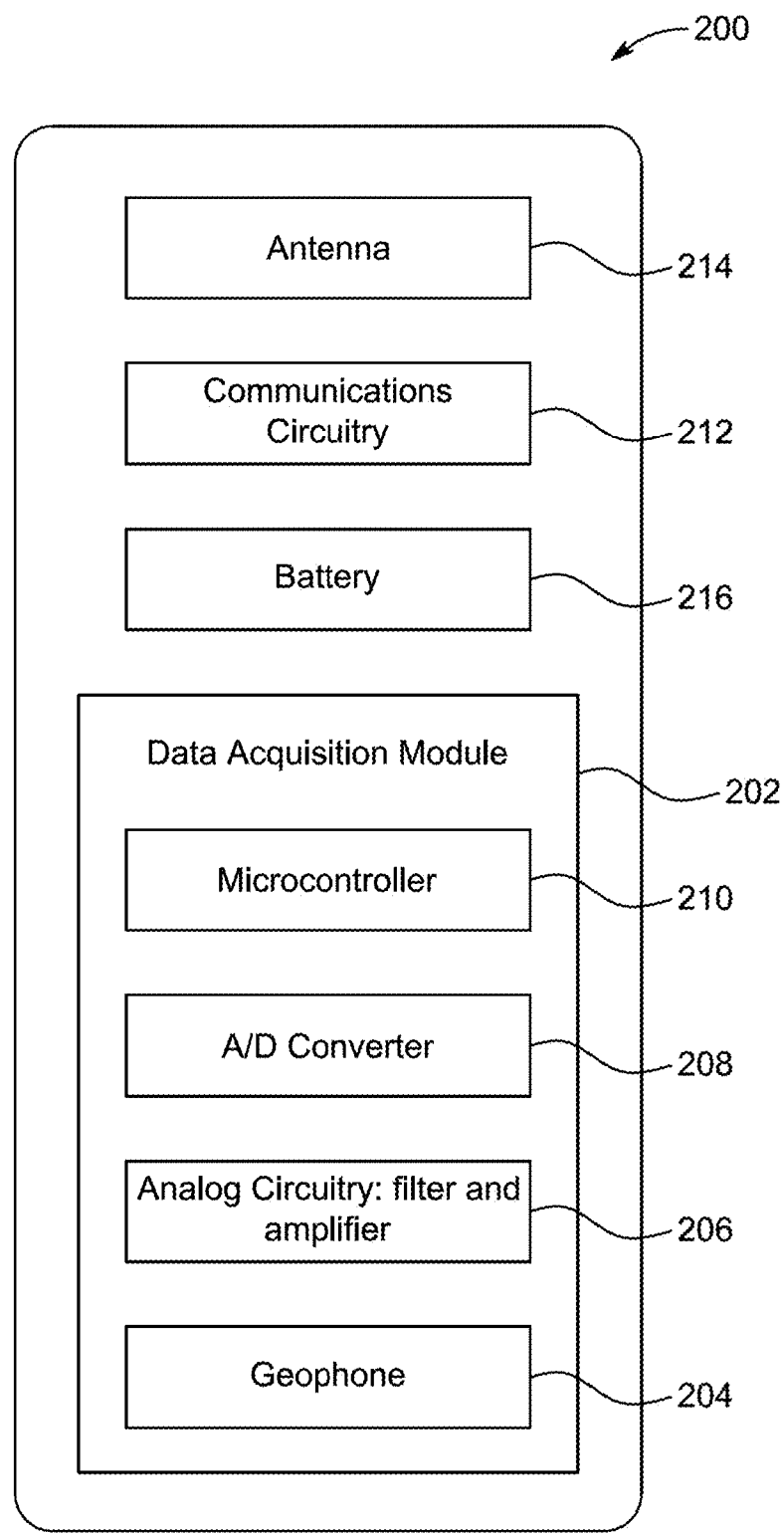
FIG. 2 is a block diagram of a wireless seismic sensor node, according to aspects of the present disclosure.

FIG. 2 is block diagram of a wireless seismic sensor node (102, 200), according to aspects of the present disclosure. The wireless seismic sensor node (102, 200) for reflection seismic survey, in the wireless seismic network 100 is configured to receive/detect seismic signals reflected and/or refracted from different strata of the Earth. In an embodiment, to perform the seismic survey, a number of wireless seismic sensor nodes (102, 200) are deployed under the surface of the Earth at a predefined depth in a particular area. In an embodiment, the survey area is at least 20 km$^2$. As shown in FIG. 2, the wireless seismic sensor node 200 includes a data acquisition module 202, a communications circuitry 212, an antenna 214, and a battery 216.

Further, the wireless seismic sensor node (102, 200) includes a memory (not shown) for recording the detected seismic signals. The memory is configured to store time stamped recording of the detected seismic signals. In an embodiment, the memory is configured to store a set of rules for processing the received signals. In one embodiment, the memory may include any computer-readable storage medium known in the art including, for example, volatile memory, such as Static Random Access Memory (SRAM) and Dynamic Random Access Memory (DRAM), and/or a non-volatile memory, such as Read Only Memory (ROM), erasable programmable ROM, flash memories, hard disks, optical disks, and magnetic tapes.

The data acquisition module 202 includes a geophone 204, an analog circuitry 206, an analog-to-digital (A/D) converter 208, and a microcontroller 210. In seismic surveys, a relevant data is collected by the wireless seismic sensor nodes 200. To find the relevancy of the data, mapping of the reflected signals is performed in space and time domain. Such reflected signals may have the same frequency as the signals sent by the seismic energy source 106. Vibrations detected by the wireless seismic sensor node (102, 200) at other frequencies may be due to other environmental sources that are of non-interest for the seismic surveys, and hence may be filtered out before any amplification.

The geophone 204 is configured to detect seismic vibrations in any direction. In an example, the geophone 204 is a ground motion sensor that converts ground vibrations into an output voltage. The output voltage represents the deviation in the ground's motion, which forms a raw data that is subsequently processed in order to study the Earth's subsurface. The geophone 204 is configured to receive/detect seismic signals reflected from different layers of the Earth.

In some embodiments, the geophone 204 may be an external device that is separate from the data acquisition module 202. In such case, the geophone 204 may be placed directly on the ground. In other embodiments, the geophone 204 is mounted within a weatherproof housing containing the data acquisition module 202. The weatherproof housing may be made of plastic or metal, such as galvanized steel. The geophone 204 may be configured in a cylindrical container or in the form of a disk.

The analog circuitry 206 is configured to filter the seismic signals detected by the geophone 204. After filtering the signal, the analog circuitry 206 is configured to provide a high voltage gain for preparing the data to be sampled at high resolution by the analog-to-digital converter 208.

The analog-to-digital converter 208 is configured to sample and digitize the received seismic signals to generate the seismic digital data.

The microcontroller 210 cooperates with the memory to receive and execute the set of program instructions for processing the received signals. The microcontroller 210 may be implemented as one or more microprocessors, microcomputers, digital signal processors, central processing units, state machines, logic circuitries, and/or any devices that manipulate signals based on program instructions.

The communications circuitry 212 is commutatively coupled to the data acquisition module 202 and receives the seismic digital data from the data acquisition module 202. In an aspect, the communications circuitry 212 includes input/output facilities. The communications circuitry 212 may be configured to communicate with other wireless geophones, the wireless gateway 104 via the input/output facilities coupled as a circuit arrangement and/or components for enabling input/output operations with the communications circuitry 212. In an embodiment, the communications circuitry 212 may include at least one antenna for transmitting and receiving signals. The communications circuitry 212 may include a wireless-frequency transceiver having a variable gain amplifier that generates radio-frequency signals for transmission. A wireless amplifier circuit may be used to amplify the radio-frequency signals at the output of the variable gain amplifier for transmission. The communications circuitry 212 is configured to transmit the recorded seismic signals as the digital data, using a combination of OFDMA and TDMA, to the central data receiving device 108. In an embodiment, the communications circuitry 212 is further configured to transmit the seismic signals such that the OFDMA subcarriers and a time shot assigned to each geophone match data acquisition parameters of the geophone of bandwidth (frequency range), sampling frequency and sampling rate, bits per sample, and recorded trace duration of the seismic digital data.

Further, the communications circuitry 212 is configured to preferably transmit the seismic digital data at a rate of 48 kbit/sec using TDMA. Each subcarrier in OFDMA preferably may have a bandwidth of 3937 Hz, and two subcarriers per time slot are assigned to one wireless seismic sensor node (102, 200).

In some embodiments, the communications circuitry 212 is further configured to wirelessly transmit the seismic digital data using the TV broadcast bands directly to the central data receiving device 108. In a preferred embodiment, the seismic digital data are transmitted in TV white bands (VHF/UHF Bands), where UHF stands for "Ultra High Frequency" while VHF stands for "Very High Frequency." UHF can range from low band (378-512 MHz) to high band (764-870 MHz) while VHF ranges from low band (49-108 MHz) to high band (169-216 MHz).

The communications circuitry 212 is further configured to transmit the seismic digital data recorded per shot substantially within 10 seconds. In some embodiments, the time slot and subcarriers assigned to each wireless geophone may be fixed. In some other embodiments, the time slot and subcarriers assigned to each wireless geophone may vary. In an embodiment, the frame size of seismic digital data of a data stream may be divided into frames, and the frame size is adjusted by the communications circuitry 212 based on a signal-to-noise ratio.

In an embodiment, the antenna 214 is configured to transmit the seismic digital data in a form of signals towards the wireless gateway 104. In another embodiment the antenna 214 is configured to receive reflected or refracted seismic signals from the various layers of the Earth within the proximity of the wireless seismic sensor node (102, 200). In one embodiment, each wireless seismic sensor node (102, 200) may include a short-range radio transmission antenna. In another embodiment, the antenna is integrated into a casing of the wireless seismic sensor node (102, 200). In a further embodiment, the wireless seismic sensor node (102, 200) may utilize directional radio antenna or antenna array to enhance communication efficiency either when the antenna acts as a receiver or a transmitter. If directionality is desired, a beam antenna with gain such as a three element Yagi or an antenna with a reflector may be used by the wireless seismic sensor node (102, 200).

In an embodiment, the wireless seismic sensor node (102, 200) has a battery (power source) 216 which is configured to provide power to each unit and module of the wireless seismic sensor node (102, 200) such that each unit properly functions. In an embodiment, the power can be used in a controlled manner to achieve extended battery life, without affecting the working of the wireless seismic sensor node (102, 200). For example, each unit of the wireless seismic sensor node (102, 200) may be configured to function at a predetermined time. In an embodiment, the wireless seismic sensor node (102, 200) may have a primary battery and a second battery. In another embodiment, the battery 216 is selected from a group including a lead acid battery, a lithium-ion battery, and a nickel-metal-hydride battery. In some embodiments, the battery 216 may be a rechargeable battery.

In an embodiment, there may be more than 50,000 wireless seismic sensor nodes (102, 200) in the survey area. When the seismic energy source 106 moves from one location to another location and broadcasts seismic signals towards surface of the Earth, the broadcasted seismic signals are reflected and/or refracted from different strata of the Earth. Each of the wireless seismic sensor nodes (102, 200) is configured to detect reflected and/or refracted seismic signals and record the detected seismic signals. Further, each of the wireless seismic sensor nodes (102, 200) is configured to transmit the recorded seismic signals as seismic digital data to the central data receiving device 108. Therefore, more than 50,000 reflected signals are recorded and transmitted. In an aspect, after one shot, the central data receiving device 108 is configured to receive about 50,000 recorded seismic signals as seismic digital data transmitted by more than 50,000 wireless seismic sensor nodes (102, 200).

In one embodiment, a wireless seismic sensor node (102, 200) is configured with a spike to be inserted into the ground. In a preferable embodiment of the invention, the seismic sensor node has a conical portion tapering steeply to a flat top and a flat circular bottom. In this configuration, much like a spinning top, a determination can be made remotely whether the seismic sensor node is positioned with its flat bottom surface in direct contact with the earth, or if the exterior conical surface is in contact with the earth. A flat bottom surface is preferably in contact with the earth as a means of better detection and recordation of seismic signals. In a still further embodiment of the invention the bottom surface is convex permitting only a bottom rim of the cone to be in contact with the earth.

Figure 3:
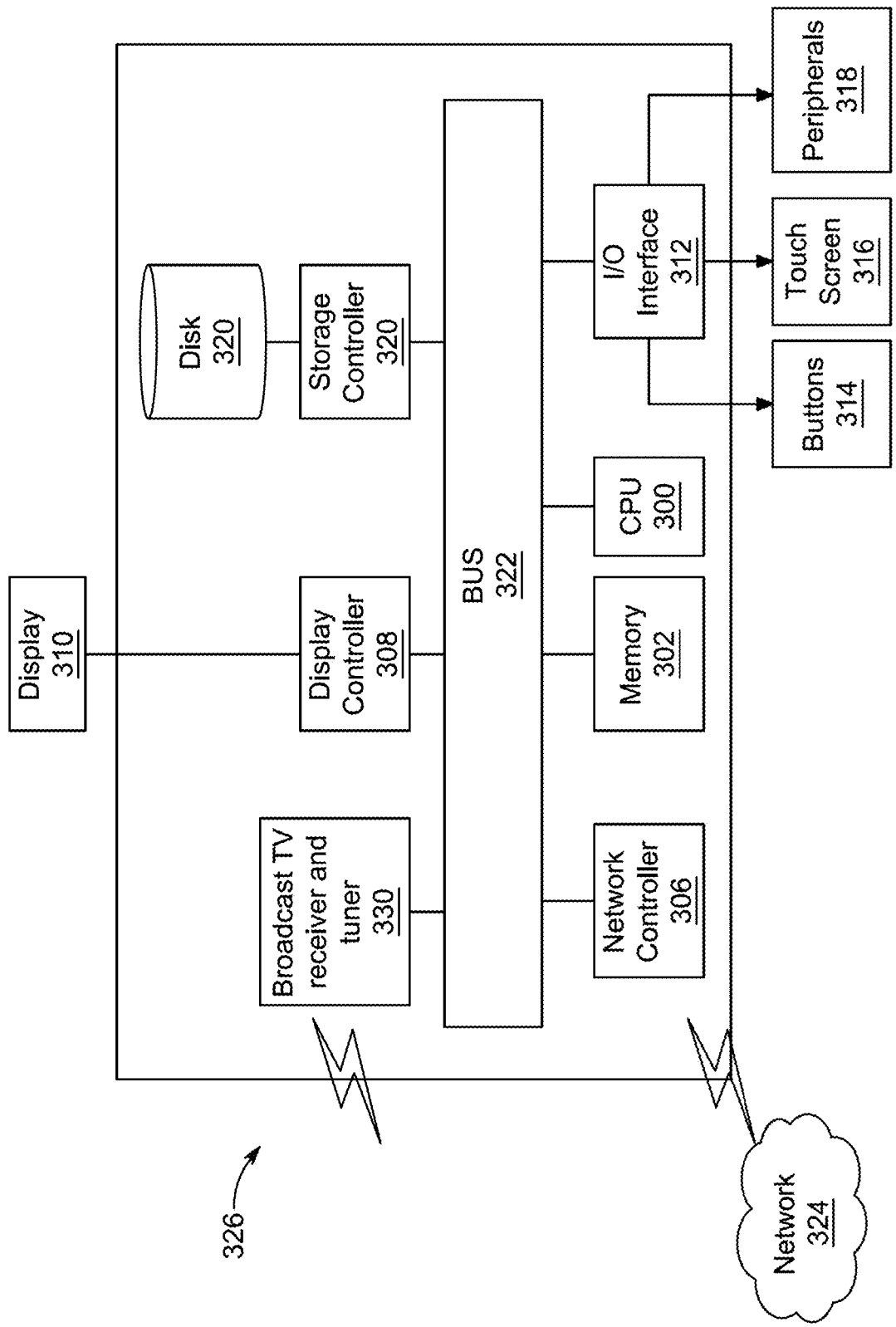
FIG. 3 is a block diagram of a wireless gateway, according to aspects of the present disclosure.

FIG. 3 illustrates a block diagram of a wireless gateway, according to aspects of the present disclosure. In some embodiments, the functions and processes of the wireless gateway 104 may be implemented by a computer 326. Next, a hardware description of the computer 326 according to exemplary embodiments is described with reference to FIG. 3. In FIG. 3, the computer 326 includes a CPU 300 which performs the processes described herein. The process data and instructions may be stored in a memory 302. These processes and instructions may also be stored on a storage medium disk 304 such as a hard drive (HDD) or portable storage medium or may be stored remotely. Further, the embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 326 communicates, such as a server or computer.

Further, the embodiments may be provided as a utility application, background daemon, or component of an operating system, or combination thereof, executing in conjunction with CPU 300 and an operating system such as Microsoft® Windows®, UNIX®, Oracle® Solaris, LINUX®, Apple macOS® and other systems known to those skilled in the art.

In order to achieve the computer 326, the hardware elements may be realized by various circuitry elements, known to those skilled in the art. For example, CPU 300 may be a Xenon® or Core® processor from Intel Corporation of America or an Opteron® processor from AMD of America, or may be other processor types that would be recognized by one of ordinary skill in the art. Alternatively, the CPU 300 may be implemented on an FPGA, ASIC, PLD or using discrete logic circuits, as one of ordinary skill in the art would recognize. Further, CPU 300 may be implemented as multiple processors cooperatively working in parallel to perform the instructions of the inventive processes described above.

The computer 326 in FIG. 3 also includes a network controller 306, such as an Intel Ethernet PRO network interface card from Intel Corporation of America, for interfacing with network 324. As can be appreciated, the network 324 can be a public network, such as the Internet, or a private network such as LAN or WAN network, or any combination thereof and can also include PSTN or ISDN sub-networks. The network 324 can also be wired, such as an Ethernet network, or can be wireless such as a cellular network including EDGE, 3G, 4G, 5G wireless cellular systems. The wireless network can also be WiFi®, Bluetooth®, or any other wireless form of communication that is known.

In one embodiment, the computer 326 includes a broadcast TV receiver and a tuner 330 to wirelessly communicate with multiple wireless Geophones over a TV broadcast signal.

The computer 326 further includes a display controller 308, such as a NVIDIA® GeForce® GTX or Quadro® graphics adaptor from NVIDIA Corporation of America for interfacing with display 310, such as a Hewlett Packard® HPL2445w LCD monitor. A general purpose I/O interface 312 interfaces with a keyboard and/or mouse 314 as well as an optional touch screen panel 316 on or separate from display 310. General purpose I/O interface also connects to a variety of peripherals 318 including printers and scanners, such as an OfficeJet© or DeskJet® from Hewlett Packard©.

A general-purpose storage controller 320 connects a storage medium disk 304 with a communication bus 322, which may be an ISA, EISA, VESA, PCI, or similar, for interconnecting all of the components of the computer 326. A description of the general features and functionality of the display 310, keyboard and/or mouse 314, as well as the display controller 308, storage controller 320, network controller 306, and general purpose I/O interface 312 is omitted herein for brevity as these features are known.

Figure 4:
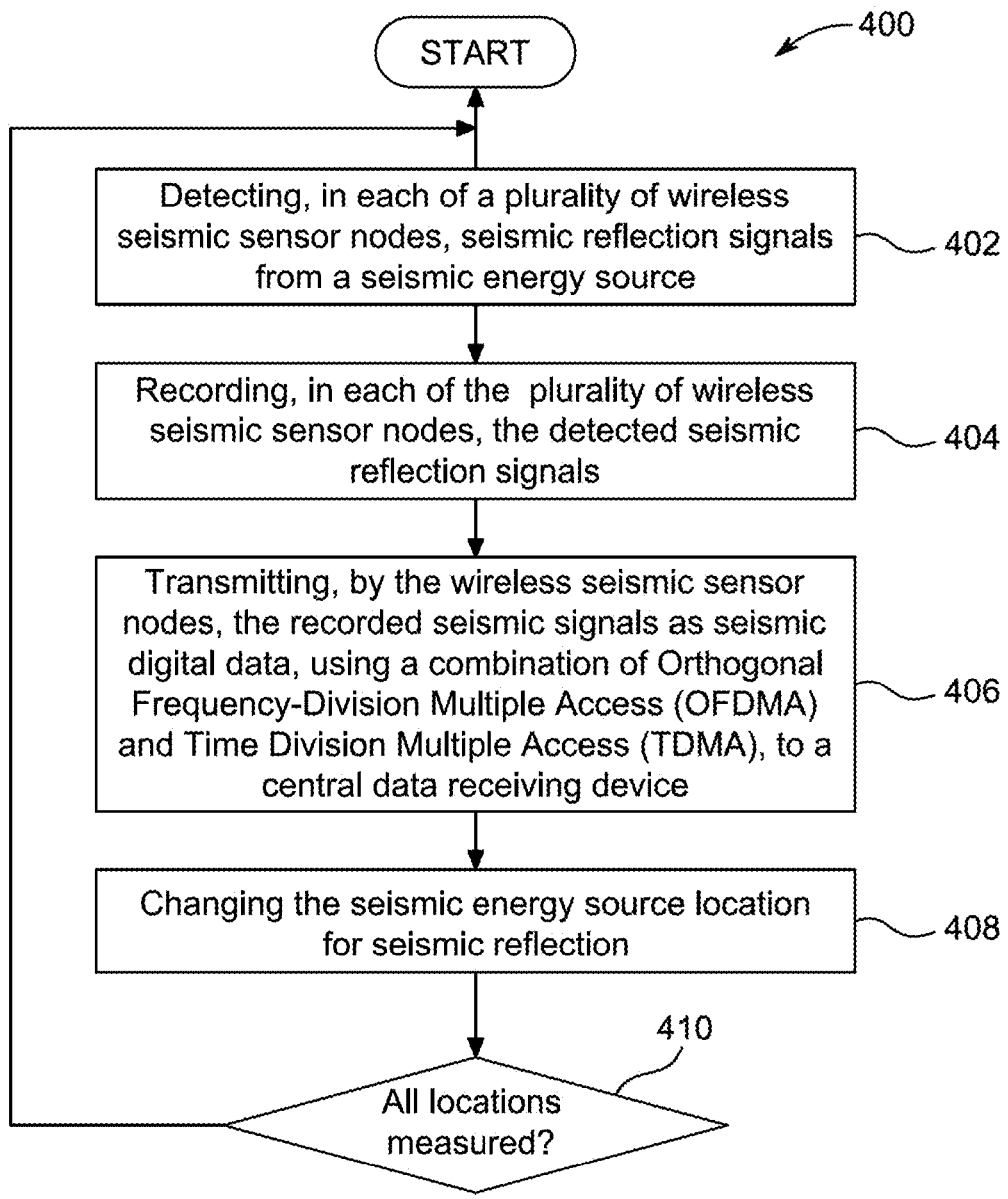
FIG. 4 is a flowchart for reflection seismic survey in a wireless seismic network, according to aspects of the present disclosure.

FIG. 4 illustrates a flowchart 400 of reflection seismic survey in a wireless seismic network within a survey area, according to certain embodiments.

In an initial step, step 402, detecting seismic reflection signals from a seismic energy source 106. In an embodiment, each of the plurality of wireless seismic sensor nodes (102, 200) is configured to detect seismic reflection signals.

In an embodiment, the seismic energy source 106 is configured to generate and broadcast radio signals/seismic signals of predetermined frequencies towards the surface of the Earth.

Step 404 includes recording of the detected seismic reflection signals in each of the plurality of wireless seismic sensor nodes (102, 200).

Step 406 includes transmitting the recorded seismic signals as seismic digital data by the wireless seismic sensor nodes (102, 200) to a central data receiving device 108. In an embodiment, the wireless seismic sensor nodes (102, 200) use a combination of OFDMA and TDMA for transmission of the seismic digital data. In another embodiment, the seismic digital data are transmitted such that the OFDMA subcarriers and a time shot assigned to each wireless seismic sensor node (102, 200) match with the data acquisition parameters of the wireless geophone. The data acquisition parameters of the wireless geophone are bandwidth, sampling frequency, bits per sample, and recorded trace duration of the seismic digital data. Each wireless seismic sensor node (102, 200) is configured to transmit the seismic digital data at a rate of 48 kbit/sec using TDMA. Each subcarrier in OFDMA has a bandwidth of 3937 Hz, and two subcarriers per time slot are assigned to one geophone.

The transmission of the seismic digital data is operated in the TV broadcast bands, and the seismic digital data is transmitted directly to the central data receiving device 108. During transmitting the seismic digital data, the seismic digital data recorded per seismic shot is transmitted substantially within 10 seconds after the seismic shot. The time slot and subcarriers assigned to each wireless geophone are fixed. The frame size of seismic digital data is divided into frames. Further, the frame size is adjusted based on a signal-to-noise ratio.

Step 408 includes changing the seismic energy source location for seismic reflection. In an embodiment, the seismic energy source 106 is configured to generate and broadcast seismic reflection signals of predetermined frequencies. In another embodiment, the seismic energy source 106 is a vibrator truck, an air gun, a thumper truck, a plasma sound source, and a seismic vibrator boomer source.

Step 410 includes repeating the detecting, recording and transmitting a number of times for each change in seismic energy source. In an embodiment, the central data receiving device 108 is configured to check whether all the survey area has been covered or not. If any survey area is remaining, the central data receiving device 108 is configured to send an instruction to the seismic energy source 106 to travel that remaining part and transmit the seismic signals towards the remaining part. As there are more than 50,000 wireless geophones, after changing the position of the seismic energy source 106, more than 50,000 reflected signals are recorded by the wireless seismic sensor nodes.

Figure 5A:
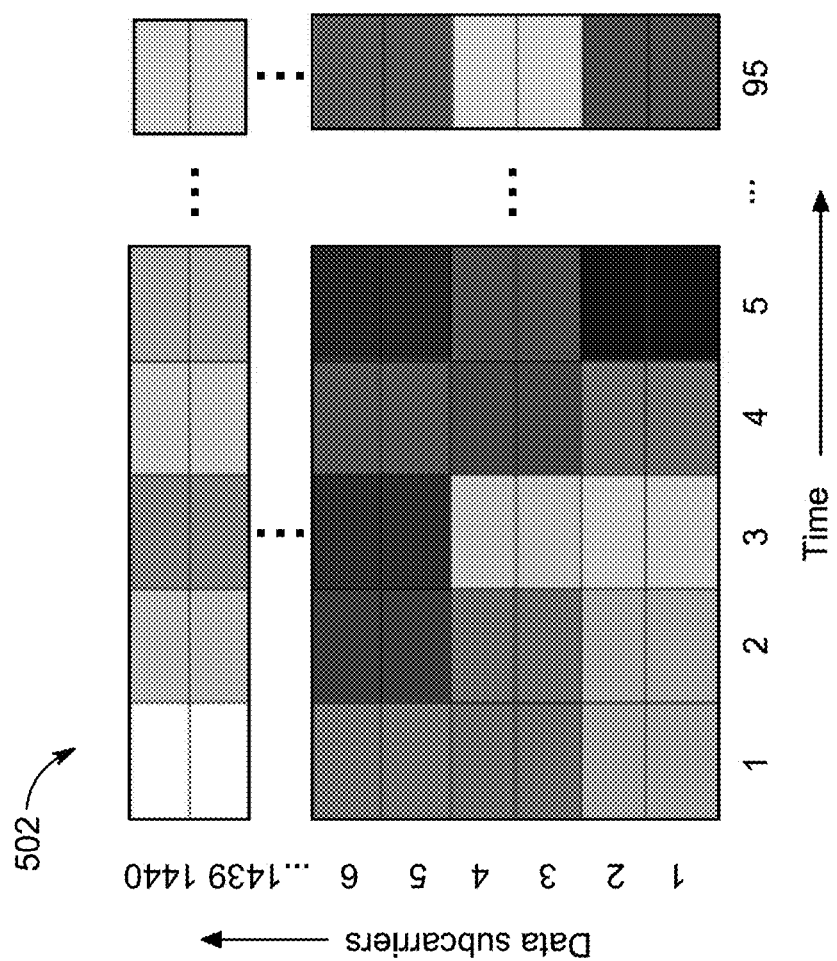
FIG. 5A illustrates channel assignment to various wireless seismic sensor node using the OFDMA-TDMA scheme, according to aspects of the present disclosure.

As shown in FIG. 5A, block 502 shows the channel assignment to various wireless geophones using the OFDMA-TDMA scheme. In the OFDMA-TDMA scheme, a particular wireless geophone is given all the sub-carriers of the network for any particular symbol duration. The OFDMA-TDMA scheme schedules multi-geophone transmissions within the time-sub-carrier 2-dimensional domain. The sub-carrier and transmission times or symbol durations are allocated to multiple geophones without overlapping so that multiple users can access the wireless media without mutual interference to each other. As an example, as shown in block 502, 1440 data subcarriers and 95 time slots are used. Therefore, the OFDMA-TDMA scheme in FIG. 5A can accommodate 136,800 (1440*95=136800) wireless geophones (indicated by various patterns) to transmit data towards the central data receiving device 108, thereby enhancing transmission rate. As mentioned above, the scheme will eventually field one million-channels. In addition, the amount of data flowing from its seismic operations may be between 200 and 400 megabytes per second.

Figure 5B:
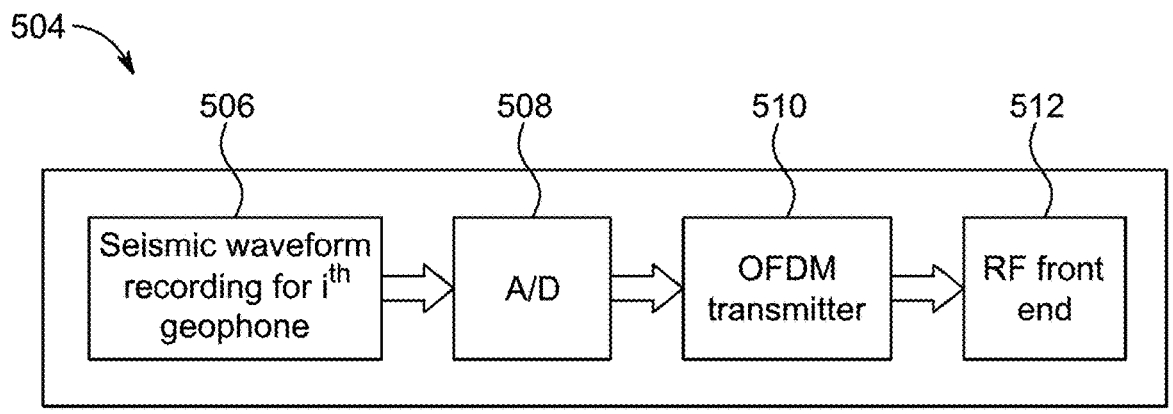
FIG. 5B illustrates a block diagram of seismic data recording and transmission at a wireless seismic sensor node, according to aspects of the present disclosure.

FIG. 5B illustrates a block diagram of seismic data recording and transmission at a wireless geophone, according to aspects of the present disclosure. Block 504 shows a transmitter at the $i^{th}$ wireless geophone (seismic data recording and transmission at the $i^{th}$ geophone). At block 506, the it wireless geophone is configured to detect the presence of the seismic signals and record the detected seismic signals. Further, at block 508, using the analog-to-digital converter the received seismic signals are converted into the seismic digital data. Furthermore, using an OFDM transmitter at block 510, the seismic digital data is converted into a baseband OFDM signal. For conversion, the seismic digital data, firstly, the data is modulated using modulation scheme such as QPSK, QAM etc. In an embodiment, a number of modulators are employed to apply multicarrier OFDM modulation to generate a number of modulated data streams. In an embodiment, the number of modulated data streams corresponds to the number of carriers of the applied multi carrier OFDM modulation.

The modulated data is processed through a number of Discrete Fourier Transformers (DFTs) which are configured to transform the number of modulated data streams into the frequency domain. Further, the signal in the frequency domain is passed by a number of phase rotation blocks, where each phase rotation block is configured to apply a specific phase rotation to each output of a respective DFT. In an embodiment, a number of subcarrier mappers is employed which are configured to map the output of the DFTs, as phased rotated by the phase rotation blocks, onto subcarriers. In last step, at least one Inverse DFT (IDFT) is configured to transform the output of the DFTs, as mapped onto the subcarriers, back to the time domain. At least one power amplifier is configured to amplify the output of the at least one IDFT.

In another embodiment, the OFDM symbol is constructed in the frequency domain by mapping the input bits on the I- and Q-components of the QAM symbols and then ordering them in a sequence with a specific length according to the number of subcarriers in the OFDM symbol. Using the mapping and ordering process, one constructs the frequency components of the OFDM symbol. To transmit the signal, the signal must be represented in time domain, accomplished by the inverse fast Fourier transform IFFT.

At block 512, in an embodiment, the radio frequency (RF) front-end module is configured to route the RF signals received from the OFDM transmitter via one or more antennas. Radio frequency (RF) front-end modules are utilized in the wireless geophones to handle RF signals transmitted to the wireless geophones and/or received by the wireless geophones. The RF front-end module may include RF front-end circuitry, such as antenna switching circuitry, that allows for RF signals to be routed to the various transmit chains and receiver chains from one or more common antennas. In one embodiment, the RF front-end module eliminates additional transmission overhead bits, simplifies transmission and reception complexity and reduces the signal peak-to-average power ratio (PAPR).

Figure 5C:
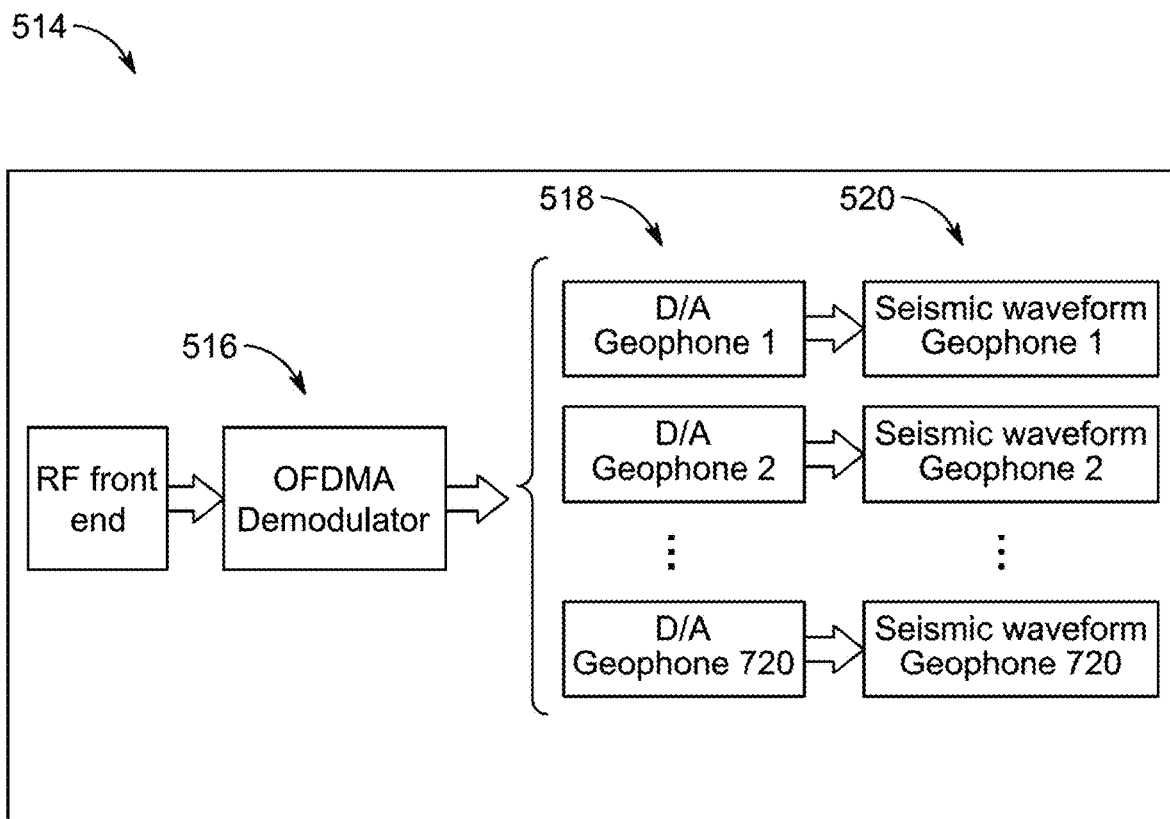
FIG. 5C illustrates a block diagram of a receiver at a central data receiving device for a specific time slot, according to aspects of the present disclosure.

As shown in FIG. 5C, block 514 shows a receiver at the central data receiving device 108 for a specific time slot. Using the radio frequency (RF) front-end module at the receiver, the RF signals are received from the OFDM transmitter via one or more antennas corresponding to the number of wireless geophones.

At block 516, an OFDM demodulator is used for demodulating the received signals at the RF front-end module using the orthogonal frequency division demodulation method. The OFDM demodulator can be an inverse operation of OFDM modulator. Signals received through the RF front end module are subjected to a fast Fourier transform (FFT) by the OFDMA demodulator. The OFDM demodulator outputs a baseband signal which represents of the modulated signal, which was input into the OFDM Modulator.

At block 518, a digital to analog converter is used that converts the digital signal into the analog signal. For example, the digital to analog converter is configured to convert the received digital data into the seismic signal for each of the wireless geophone.

At block 520, the output of the digital to analog converter is received and displayed as seismic waveform corresponding to each of the wireless geophone.

The present disclosure derives the throughput and transmission time from wireless geophones to the central data receiving device 108 in the wireless seismic network 100 based on OFDMA-TDMA scheme. Transmitting the seismic digital data using the OFDMA-TDMA scheme requires that the OFDM subcarriers and time shot assigned to each wireless geophone must match with the acquisition parameters, like bandwidth, sampling frequency, bits per sample, and trace duration (trace length) of the seismic data. In particular, the seismic digital data has a typical sampling frequency of $f_s$=500 Hz and the trace length of about 6 sec. A 24-bit A/D converter is used that yields a data acquisition rate of 12 kbits/sec. The data acquisition rate per wireless geophone is 36 kbits/sec. Developing an OFDMA-TDMA (hybrid system)-based wireless geophone network of the present disclosure, ensures the timely delivery of the seismic data in a high dense setup.

In an operative embodiment, the present disclosure operates in TV white space, i.e., the IEEE 802.22 standard. As regional area network has a range up to 30 km$^2$, therefore, the physical layer system parameters related to IEEE 802.22 standard are used. For this standard, the data rate for the Binary Phase Shift Keying (BPSK) in a 6 MHz channel is 4.56 Mbits/sec. Since BPSK has a low bit error rate, BPSK is then considered as the modulation scheme in the present disclosure. Furthermore, in one OFDM symbol, there are 2048 data carriers out of which 1440 data carriers are used for data and the rest data carriers (2048−1440=608) for guard and pilots. Further, it is noted that in the 6 MHz channel, the signal bandwidth is 5.67 MHz, which is occupied by 1440 data carriers.

Now considering the following parameters for seismic data acquisition and wireless regional area network, the wireless seismic network 100 is designed as follows: given that each wireless geophone can transmit data at a rate of 48 kbit/sec (higher than the minimum 36 kbits/sec) using TDMA for a total data rate of 4.56 Mbits/sec, results in 95 geophones. Moreover, each subcarrier in OFDMA has a bandwidth of 3937 Hz (signal bandwidth per data carrier in one OFDM symbol). At a particular instant, two subcarriers per time slot are assigned to one geophone to optimize the Fast Fourier Transform (FFT) processing. In this way, the considered setup supports up to 95×(1440/2) geophones with a range of 30 km. This arrangement is enough for a typical survey area of around 20 km$^2$.

Figure 6:
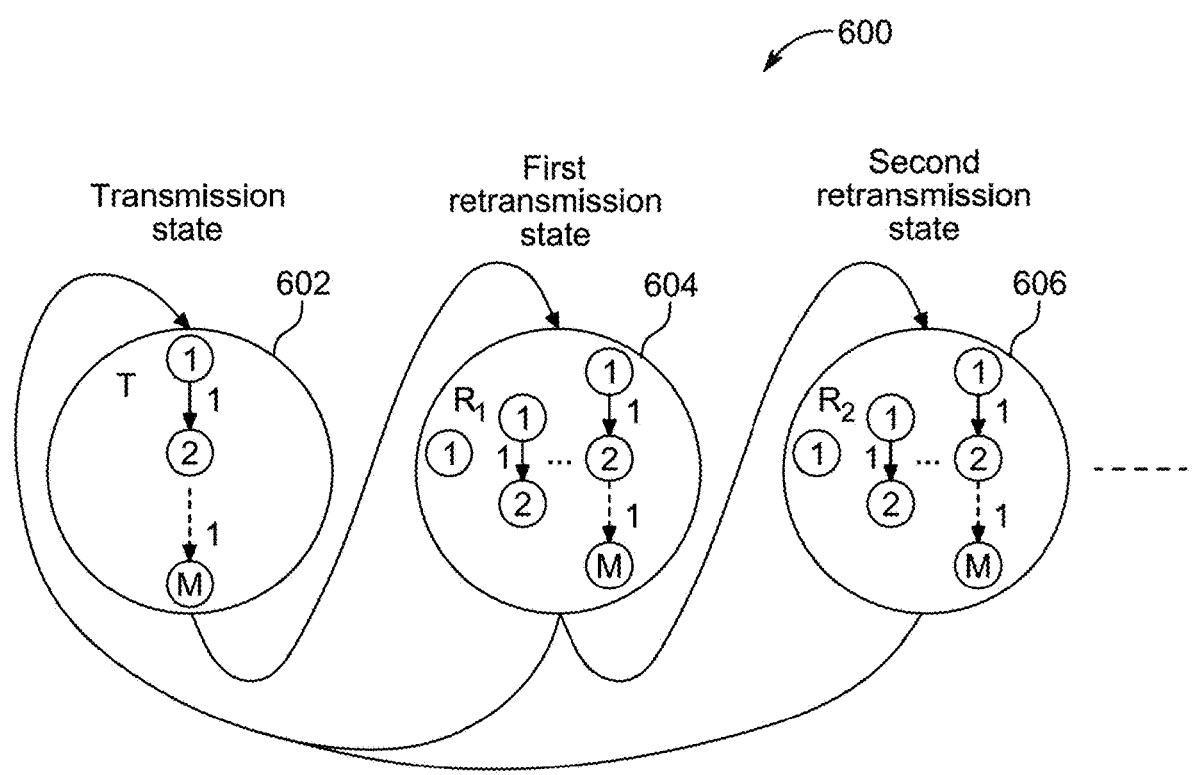
FIG. 6 is a diagram of a state transition model of seismic data transmission, according to aspects of the present disclosure.

A Markov chain approach is used to model the wireless data transmission, for purposes of initial evaluation. FIG. 6 is a diagram of a state transition model of seismic digital data transmission, according to aspects of the present disclosure. In FIG. 6, a transmission state is indicated by 602. 604 represents the first transmission state, and 606 represents the second transmission state. The present disclosure employs the Markov chain to model the transmission of the seismic digital data from the wireless seismic sensor node (102, 200) to the central data receiving device 108. The Markov chain analysis is used to optimize system parameters like throughput. A seismic shot data comprises M frames, where each frame has N information bits. Once the data of current seismic shot is received successfully by the central data receiving device 108, the next shot data is transmitted.

The set T is the geophone states while a geophone is transmitting a window of M recorded frames. The set $R_i$ is the geophone state while it is retransmitting the erroneous or lost frames for the it time. As shown in FIG. 6, all the transmission states (602, 604, 606) in each column are equally probable since the probability of transition between them is one. The state probability distribution vector a Π is organized as follows:

$$\Pi = [T\,\mathcal{R}_1\,\mathcal{R}_2\,\mathcal{R}_3\ldots]^t, \tag{1}$$

where t denotes transpose operation. In the case of three frames to be transmitted, i.e., M=3 as an example, the state probability distribution vector is given as:

$$\Pi = [T|R_{1,1}R_{1,2}R_{1,3}|R_{2,1}R_{2,2}R_{2,3}|\ldots]^t,$$

where T represents the state of transmitting a frame and $R_{i,j}$ represents the $i^{th}$ re-transmission state when j frames are to be retransmitted. Therefore, the corresponding geophone transition matrix when M=3, can be set up as:

$$P = \begin{bmatrix} p_{3,0} & p_{1,0} & p_{2,0} & p_{3,0} & p_{1,0} & p_{2,0} & p_{3,0} & \cdots \\ p_{3,1} & 0 & 0 & 0 & 0 & 0 & 0 & \cdots \\ p_{3,2} & 0 & 0 & 0 & 0 & 0 & 0 & \cdots \\ p_{3,3} & 0 & 0 & 0 & 0 & 0 & 0 & \cdots \\ 0 & p_{1,1} & p_{2,1} & p_{3,1} & 0 & 0 & 0 & \cdots \\ 0 & 0 & p_{2,2} & p_{3,2} & 0 & 0 & 0 & \cdots \\ 0 & 0 & 0 & p_{3,3} & 0 & 0 & 0 & \cdots \\ \vdots & \vdots & \vdots & \vdots & \vdots & \vdots & \vdots & \ddots \end{bmatrix}, \tag{2}$$

where the transition probability $p_{i,j}$ is the likelihood of retransmitting j frames while i frames are sent, and it is equal to:

$$p_{i,j} = \binom{i}{j}(1-\sigma)^{i-j}\sigma^j, \tag{3}$$

where σ is the probability that one or more bits in a frame are in error and it is defined as follows:

$$\sigma = 1-(1-\rho)^N, \tag{4}$$

where $\rho = Q(\sqrt{2E_b/N_O})$ is the bit error rate (BER) for Additive white Gaussian noise (AWGN) channel where (Q(.) is the Q-function, $E_b$ and $N_O$ are the energy per bit and noise spectral density, respectively.

In case of a fading channel, the received signal is y=hx+z, where h=ae$^\varphi$ is a fading channel coefficient with magnitude a, and phase φ, x is the transmitted signal, and z is white Gaussian noise.

The fading energy per bit is given as $|h|^2 E_b/N_O = a^2 E_b/N_O$.

Since a is a random quantity, the average BER is calculated with respect to the distribution of a. For the Rayleigh channel, the distribution is $F(a)=2ae^{-a^2}$. The average BER is calculated by solving the integral:

$$\int_0^\infty Q\left(\sqrt{2a^2 E_b/N_0}\right) F(a) da;$$

Hence, the BER for fading channel is $$\rho = \frac{1}{2}\left(1 - \sqrt{\frac{E_b/N_o}{1+E_b/N_o}}\right).$$

The state probability distribution vector Π is obtained by solving the following global balance equation:

$$P\Pi = \Pi, \quad (5)$$

with an additional constraint $$1\Pi = 1, \quad (6)$$

where 1 represents a row vector of ones. Equations (5) and (6) can be solved using MATLAB.

Alternatively, an iterative procedure can be used to find Π, given as below.

The state probabilities associated with the $r^{th}$ re-transmission, i.e., $\mathcal{R}_r$ are given by the following iterative expression:

$$R_{r,j} = \sum_{i=j}^M R_{r-1,i} p_{i,j} \quad \begin{array}{l} r = 2, 3, \ldots \\ j = 1, 2, \ldots M \end{array} \quad (7)$$

and the initial state probabilities associated with $R_1$ as:

$$R_{1,j} = T p_{M,j}, j=1,2,\ldots,M \quad (8)$$

Solving for Π Iteratively:

Following equations (7) and (8), all the re-transmission state probabilities are expressed in terms of the transmit state probability T. The state probability distribution vector Π is obtained iteratively according to:

Initialize the transmission state with a random number value, e.g., T=rand.

Estimate the re-transmission state probabilities $R_1$ using equation (8), and the rest $R_r$ (for r>1) using equation (7).

Sum all the transmission and re-transmission state probabilities in order to satisfy equation (6)

$$\alpha = MT + \sum_{r=1}^{R_{max}} \sum_{i=1}^M iR_{r,i}$$

where $R_{max}$ is the maximum re-transmissions allowed, and α is the normalization constant.

Calculate the normalized state probability distribution vector, e.g., for M=3 and $R_{max}$=3, as follows:

$$\prod = \frac{1}{\alpha}[T|R_{1,1} \ R_{1,2} \ R_{1,3}|R_{2,1} \ R_{2,2} \ R_{2,3}|R_{3,3}]^t$$

Note that the sizes of P and Π are $(MR_{max}+1)\times(MR_{max}+1)$ and $(MR_{max}+1)\times 1$, respectively. The state probabilities are useful in deriving the throughput and transmission time expressions.

Performance Measures

The wireless geophone keeps retransmitting the erroneous frames until all the frames of the current shot are received error-free. Hence, the wireless geophone starts to transmit the next shot data after successful transmission of current shot data. The average number of re-transmissions and frames sent during each re-transmission are estimated, thereby, calculating the average delay incurred by a frame and throughput when there are transmission errors. The transmission time for the whole shot data can then be calculated and the parameters like packet size can be optimized to perform the acquisition process seamlessly. In the ensuing, key performance indices are derived.

A. Average Number of Re-Transmissions $A_n$

The probability of the geophone being in the $r^{th}$ re-transmission state has the form:

$$\beta_r = \sum_{i=1}^M R_{r,i}. \quad (9)$$

Consequently, the mean number of re-transmissions by the geophone for M frames (per seismic shot) is found to be:

$$A_n = \frac{1}{T}\sum_{r=1}^{R_{max}} \beta_r. \quad (10)$$

B. Average Delay D

At the $r^{th}$ re-transmission, the average number of frames sent is obtained according to $$n_r = \sum_{i=1}^M iR_{r,i} \quad (11)$$

The average delay (in terms of frames) associated with a frame retransmitted $r^{th}$ time is comprised of the transmission delay and the accumulation of all the delays due to re-transmissions. Thus, the average delay can be written as $$d_r = M + \frac{1}{T}\sum_{j=1}^r n_j. \quad (12)$$

The average delay (in terms of bits) incurred while transmitting a payload bit is the sum of transmitted and retransmitted bits per seismic shot divided by the total payload bits per seismic shot and can be shown to be $$D = 1 + \frac{H}{N} + \frac{(N+H)\sum_{r=1}^{R_{max}} n_r}{NMT}, \quad (13)$$

where H and N are the header size and payload size in bits, respectively, and B=N+H.

C. Average Number of Retransmitted Frames $M_r$

The average number of retransmitted frames shall be determined according to $$M_r = \frac{1}{T}\sum_{r=1}^{R_{max}} n_r. \qquad (14)$$

D. Normalized Throughput (η)

The normalized throughput of the protocol is the ratio of the total number of information bits per seismic shot to the total number of bits transmitted including re-transmissions and headers, i.e., $$\eta = \frac{MN}{(M+M_r)(N+H)}. \qquad (15)$$

When there are no errors $M_r=0$ and the throughput is maximum, i.e., $$\eta_{max} = \frac{N}{N+H}. \qquad (16)$$

Figure 7:
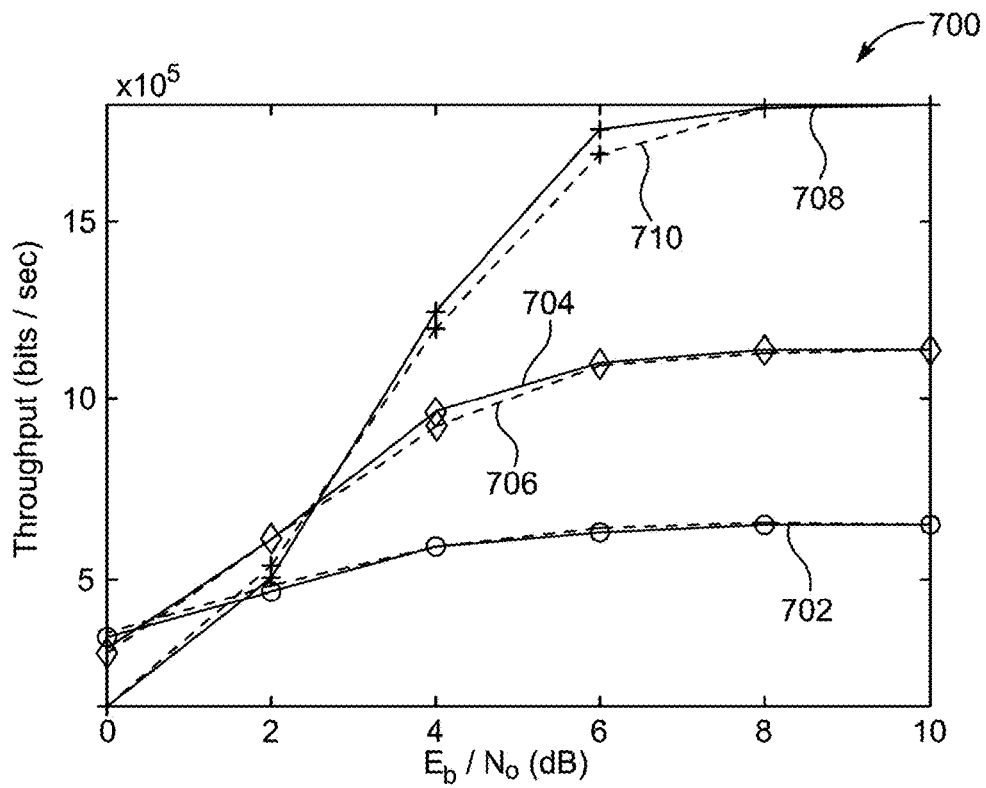
FIG. 7 is a diagram of a graph of throughput per wireless seismic sensor node versus signal-to-noise ratio, according to aspects of the present disclosure.
Figure 8:
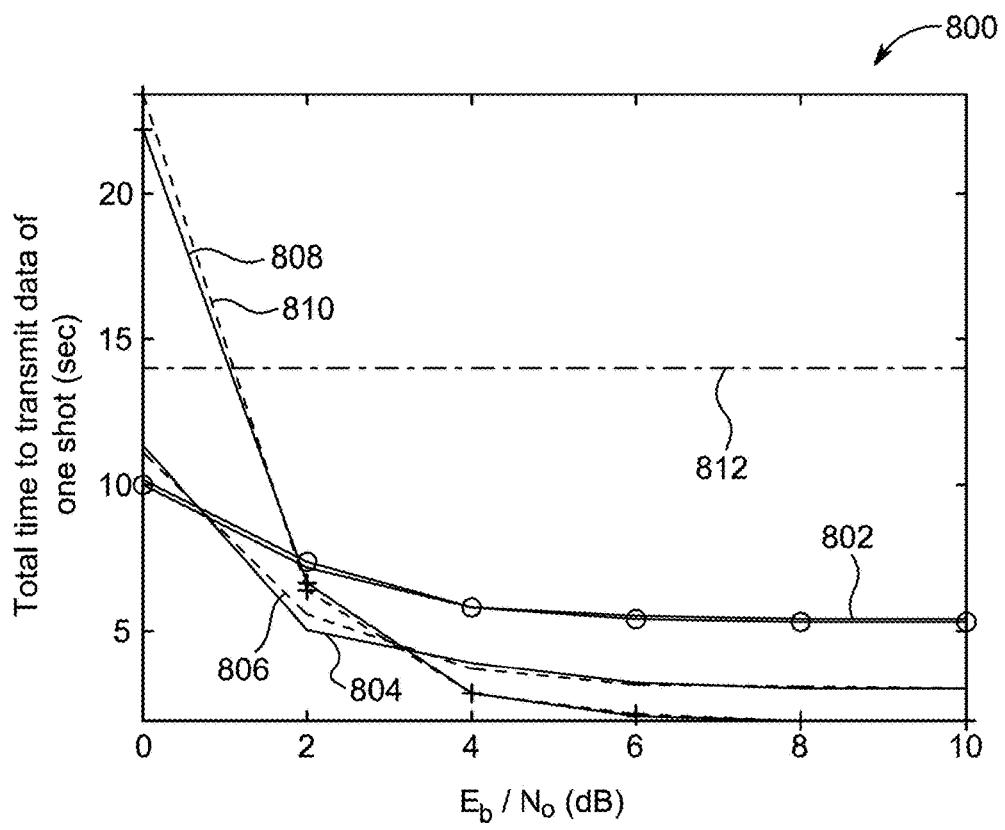
FIG. 8 is a diagram of a graph of time to transmit data of one shot to the central data receiving device versus signal-to-noise ratio, according to aspects of the present disclosure.
Figure 9:
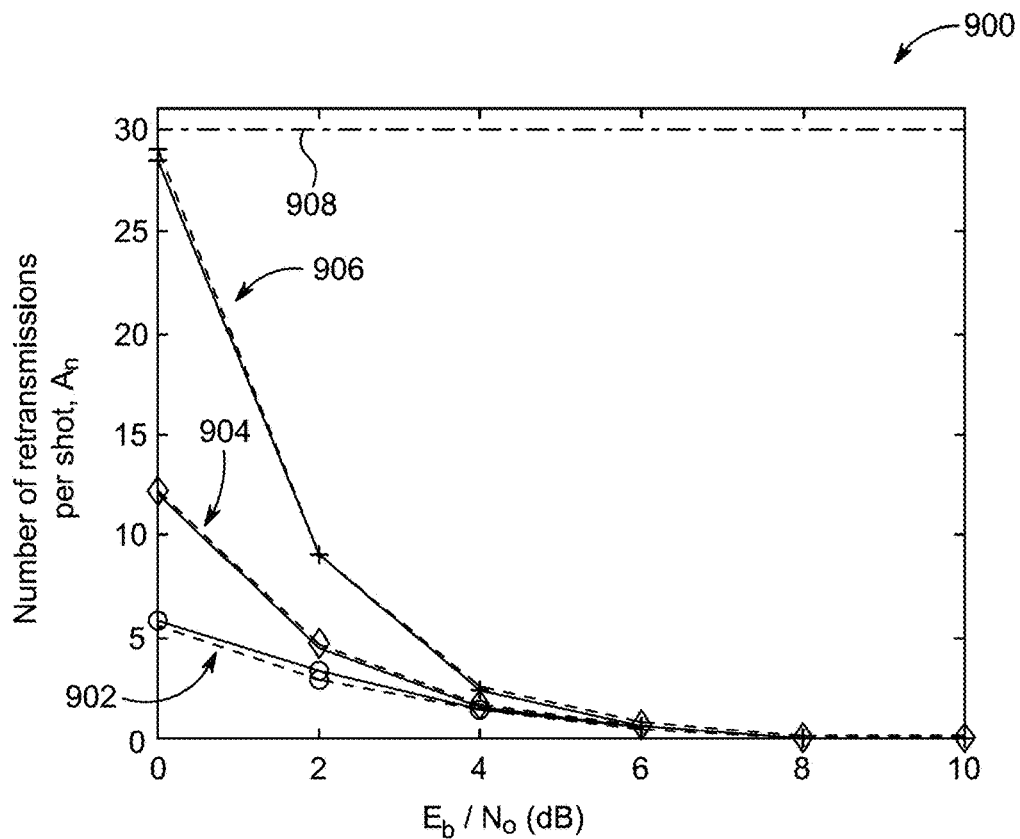
FIG. 9 is a diagram of a graph of re-transmission by wireless seismic sensor node per M frames (shot) versus signal-to-noise ratio, according to aspects of the present disclosure.

FIG. 7 is a diagram of a graph (700) of throughput per geophone versus signal-to-noise ratio, according to aspects of the present disclosure. FIGS. 7, 8, and 9 are plotted for AWGN channel and sampling frequency $f_s$=500 Hz. In an embodiment, the inter-shot time for the seismic acquisition is 14 sec. Therefore, the data of a seismic shot must be transmitted within this time. To ensure a quick quality check at the central data receiving device 108, a strict condition is assumed, i.e., when a bit in a frame is in error, it is retransmitted. The throughput between the wireless geophone and the central data receiving device 108 is plotted in FIG. 7 for various frame sizes and signal-to-noise ratio (SNR) per bit levels. As shown in FIG. 7, for a payload size of N=8 bits, both theoretical value and simulation value is the same, indicated by line 702. In FIG. 7, for a payload size of N=16 bits, plot line 706 illustrates theoretical value, and plot line 704 illustrates simulation value of the throughput per geophone. Further, for a payload size of N=32 bits, plot line 710 illustrates theoretical value and plot line 708 illustrates simulation value of the throughput per geophone. As can be seen from FIG. 7 the throughput is lowest for large frame payload sizes of N=8 bits to N=32 bits, and the SNR is low (toward left end of the plot in FIG. 7). Conversely, a high throughput is required for higher frame payload sizes in order to achieve a high SNR (toward right end of the plot in FIG. 7). The reason for this relationship is that transmitting smaller frames requires more overhead (for whole shot data) but has a beneficial high SNR. On the other hand, larger frames require more re-transmissions due to low SNR. The throughput saturates for any value of frame payload size N, however, not attaining the same throughput value. The throughput saturation happens when the header size is fixed having the same information for any payload size. In such case, reducing the payload size results in that the saturated throughput is less due to more overhead.

FIG. 8 is a diagram of a graph (800) of time to transmit data of one shot to the central data receiving device 108 versus signal-to-noise ratio, according to aspects of the present disclosure.

As shown in FIG. 8, the total time (in seconds) to transmit the whole data of $t_s$=6 sec (trace length) by a geophone is found to be $$D_s = \frac{D \times f_s \times 24 \times t_s \times 95}{2d}, \qquad (17)$$

where d is the data rate (4.56 Mbits/sec), and the header size is taken as 6 bytes (H=48 bits).

As shown in FIG. 8, for N (number of information bits)=8, both theoretical value and simulation value for transmission time is the same, indicated by line 802. In an embodiment, the inter-shot time for the seismic acquisition is 14 sec (shown by plot line 812). The transmission time is around 10 sec (N=8 bits) when the SNR is 0 dB. Further, for N=16 information bits, plot line 806 illustrates theoretical value and plot line 804 illustrates simulation value of the transmission time. Further, for N=32 information bits, plot line 810 illustrates theoretical value and plot line 808 illustrates simulation value of the transmission time taken by each wireless geophone. In a similar existing system, the transmission time from the wireless geophone to the intermediate node (wireless gateway node) was around 50 sec at 20 dB SNR with each intermediate gateway node serving 200 wireless geophones. Furthermore, the wireless gateway is linked to the central data receiving device 108 using a wire.

The time achieved by employing the present disclosure is far better than using the random access method by avoiding the need for an intermediate gateway node. In the random access method, more time and processing power is wasted due to sensing the channel, collision, backoff, and then re-transmission. On the other hand, in the disclosed method, time slot and subcarriers are assigned to the wireless geophone are hardwired (fixed) and, therefore, complexity is much less. Since there is no intermediate node, the interference among the cells served by different intermediate nodes is also avoided. Hence, improving the overall performance in terms of time and throughput. Furthermore, the achieved 10 sec transmission time is well within the range of the inter-shot time. Hence, the acquisition process performs seamlessly without interruption. Although, a frame with N=8 information bits fulfills the requirements, however, a large packet at high SNR saves resources (also less time is required). Therefore, an adaptive frame size can be used. More importantly, the hardware cost is much less than in known prior art because no gateway is used.

Next, the re-transmission per shot (900) is depicted in FIG. 9 to illustrate the re-transmission required for various SNR levels. As shown in FIG. 9, for N (number of information bits)=8, both theoretical value and simulation value of number of re-transmission is same, indicated by line 902. Further, for N=16 information bits, plot line 904 illustrates theoretical value and simulation value of number of re-transmission (similar). Further, for N=32 information bits, both theoretical value and simulation value of number of re-transmission is same, indicated by line 906. The actual re-transmission required is compared with the maximum retry limit $R_{max}$ (shown by plot line 908). In order not to drop frames, the average re-transmission $A_n$ must be less than the maximum allowed re-transmissions $R_{max}$. As can be seen from FIG. 9, the frames are not dropped even with the payload size of N=32 information bits (as shown by plot line 906). However, increasing the payload size results in an increase in the number of retransmissions. At high SNR, with no or less bits in error, the number of re-transmissions approaches zero. This is regardless of overhead (header).

Figure 10:
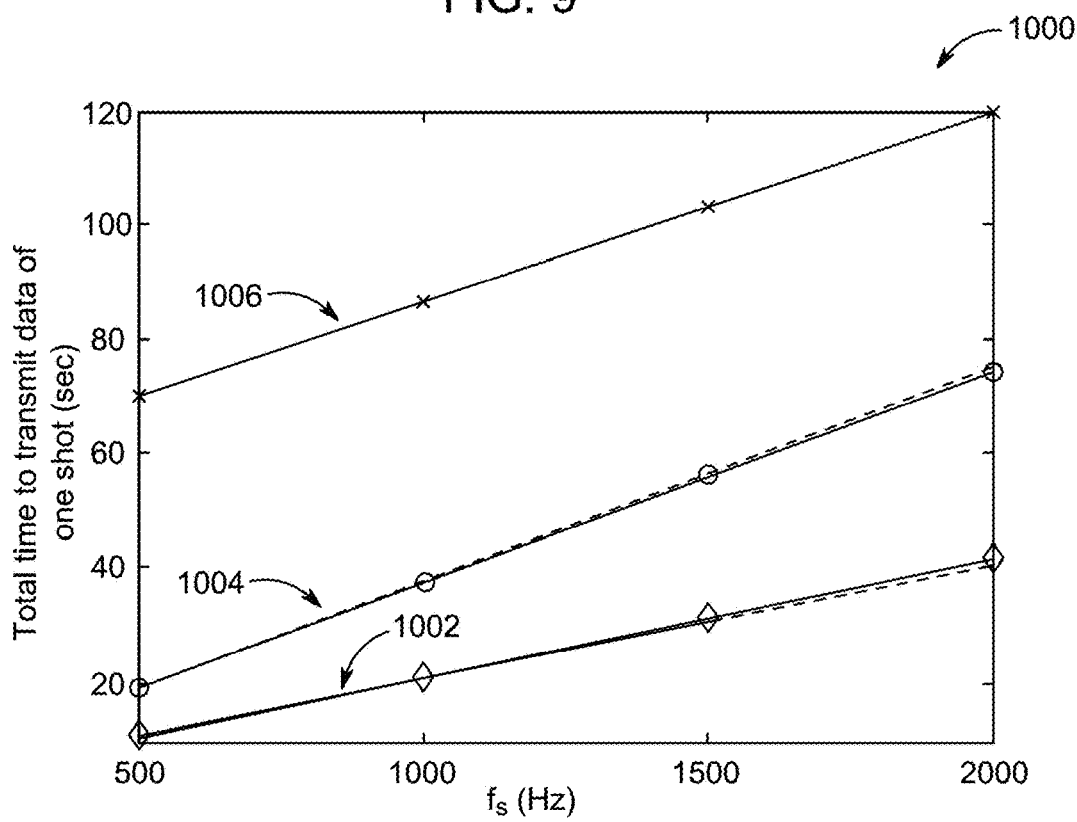
FIG. 10 is a diagram of a graph of time to transmit data of one shot to the central data receiving device versus sampling frequency, according to aspects of the present disclosure.

FIG. 10 is a diagram of a graph (1000) of time to transmit data of one shot to the central data receiving device versus sampling frequency, according to aspects of the present disclosure. FIG. 10 illustrates the effect of various sampling frequencies for AWGN and Rayleigh Fading channels and comparison with the prior art. As shown in FIG. 10, for payload N (number of information bits)=8, both theoretical value and simulation value of time to transmit data of one shot is same, indicated by line 1002. Further, for payload N=16 information bits, plot line 1004 illustrates time to transmit data of one shot (having similar value of theoretical result and simulation result). Further, for payload N=32 information bits, both theoretical value and simulation value of time to transmit data of one shot is same, indicated by line 1006. It is evident from FIG. 10 that the time to transmit data of one shot is very small for the disclosed scheme when compared to that obtained by the existing schemes.

The method of reflection seismic survey of FIGS. 1-5 is in a wireless seismic network within a large survey area, preferably greater that 20 km$^2$. The method includes detecting, in each of a plurality of wireless seismic sensor nodes, seismic reflection signals from a seismic energy source; recording, in each of the plurality of wireless seismic sensor nodes, the detected seismic reflection signals; transmitting, by the wireless seismic sensor nodes, the recorded seismic signals as seismic digital data, using a combination of OFDMA and TDMA, to a central data receiving device 108; changing the seismic energy source location for seismic reflection; and repeating the detecting, recording and transmitting a number of times for each change in seismic energy source.

The method further includes transmitting the seismic signals such that OFDMA subcarriers and a time shot assigned to each wireless seismic sensor node match data acquisition parameters of wireless seismic sensor node of bandwidth, sampling frequency, bits per sample, and recorded trace duration of the seismic digital data.

The method further includes transmitting the seismic digital data is performed by each wireless seismic sensor node transmitting data at a predetermined transmission rate using TDMA, where each subcarrier in OFDMA has a predetermined bandwidth, and two subcarriers per time slot are assigned to one wireless seismic sensor node.

The survey area is at least 20 km$^2$. The wireless transmission of the seismic digital data is operated in TV broadcast bands, and the seismic digital data is transmitted directly to the central data receiving device.

In transmitting the seismic digital data, the seismic digital data recorded per shot is transmitted substantially within 10 seconds, a time slot and subcarriers assigned to each wireless seismic sensor node are fixed, and frame size, of a data stream divided into frames, of seismic digital data is adjusted based on a signal-to-noise ratio.

The frame size of the seismic digital data has a payload size of 16 bits.

The wireless seismic sensor nodes for reflection seismic survey of FIGS. 1-5 is in a wireless seismic network within a survey area. Each of a plurality of the wireless seismic sensor nodes includes communications circuitry configured to detect seismic reflection signals from a seismic energy source; a memory for recording the detected seismic reflection signals; and the communications circuitry 212 configured to transmit the recorded seismic signals as digital data, using a combination of Orthogonal Frequency-Division Multiple Access (OFDMA) and Time Division Multiple Access (TDMA), to a central data receiving device, wherein the detecting, recording and transmitting is repeated substantially a number of times upon changing the source location for the seismic reflection signals.

The communications circuitry 212 is further configured to transmit the seismic signals such that OFDMA subcarriers and a time shot assigned to each wireless seismic sensor node match data acquisition parameters of wireless seismic sensor node of bandwidth, sampling frequency, bits per sample, and recorded trace duration of the seismic digital data.

The communications circuitry 212 is configured to transmit the seismic digital data at a predetermined transmission rate using TDMA, wherein each subcarrier in OFDMA has a predetermined bandwidth, and two subcarriers per time slot are assigned to one wireless seismic sensor node.

The survey area is 20 km$^2$. The communications circuitry 212 is further configured to wireless transmit the seismic digital data using TV broadcast bands directly to the central data receiving device.

The communications circuitry 212 is further configured to transmit the seismic digital data recorded per shot substantially within 10 seconds, wherein a time slot and subcarriers assigned to each wireless seismic sensor node are fixed, and wherein frame size, of a data stream divided into frames, of seismic digital data is adjusted by the communications circuitry 212 based on a signal-to-noise ratio.

The frame size of the seismic digital data has a payload size of 16 bits.

A non-transitory computer-readable storage medium of FIGS. 1-5 storing instructions for reflection seismic survey in a wireless seismic network within a survey area, processing circuitry, in each of a plurality of wireless seismic sensor nodes, executes the instructions according to a method including detecting, in each of a plurality of wireless seismic sensor nodes, seismic reflection signals from a seismic energy source;

recording, in each of the plurality of wireless seismic sensor nodes, the detected seismic reflection signals;

transmitting the recorded seismic signals as seismic digital data, using a combination of Orthogonal Frequency-Division Multiple Access (OFDMA) and Time Division Multiple Access (TDMA), to a central data receiving device;

monitoring a change in the seismic energy source location for seismic reflection; and repeating the detecting, recording and transmitting a plurality of times for each change in seismic energy source.

The non-transitory computer-readable storage medium further includes transmitting the seismic signals such that OFDMA subcarriers and a time shot assigned to each wireless seismic sensor node match data acquisition parameters of wireless seismic sensor node of bandwidth, sampling frequency, bits per sample, and recorded trace duration of the seismic digital data.

The non-transitory computer-readable storage medium further includes transmitting the seismic digital data is performed by each wireless seismic sensor node transmitting data at a predetermined transmission rate using TDMA, where each subcarrier in OFDMA has a predetermined bandwidth, and two subcarriers per time slot are assigned to one wireless seismic sensor node.

The survey area is at least 20 km$^2$. The wireless transmission of the seismic digital data is operated in TV broadcast bands, and the seismic digital data is transmitted directly to the central data receiving device.

In transmitting the seismic digital data, the seismic digital data recorded per shot is transmitted substantially within 10 seconds, a time slot and subcarriers assigned to each wireless seismic sensor node are fixed, and frame size, of a data stream divided into frames, of seismic digital data is adjusted based on a signal-to-noise ratio.

The frame size of the seismic digital data has a payload size of 16 bits.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A non-transitory computer-readable storage medium storing program instructions for reflection seismic survey in a wireless seismic network within a survey area, processing circuitry, in each of a plurality of wireless seismic sensor nodes, executes the program instructions according to a method comprising:
   detecting, in each of the plurality of wireless seismic sensor nodes, seismic reflection signals from a seismic energy source;
   recording, in each of the plurality of wireless seismic sensor nodes, the detected seismic reflection signals;
   transmitting the recorded seismic signals as seismic digital data, using a combination of Orthogonal Frequency-Division Multiple Access (OFDMA) and Time Division Multiple Access (TDMA), to a central data receiving device;
   monitoring a change in the seismic energy source location for seismic reflection; and
   repeating the detecting, recording and transmitting a number of times for each change in seismic energy source,
   wherein each seismic sensor node of the plurality of wireless seismic sensor nodes is a a ground motion sensor that converts ground vibrations into an output voltage.

2. The non-transitory computer-readable storage medium of claim 1, further comprising: transmitting the seismic signals such that OFDMA subcarriers and a time shot assigned to each wireless seismic sensor node match data acquisition parameters of wireless seismic sensor node of bandwidth, sampling frequency, bits per sample, and recorded trace duration of the seismic digital data.

3. The non-transitory computer-readable storage medium of claim 1, wherein
   the transmitting the seismic digital data is performed by each wireless seismic sensor node transmitting data at a predetermined transmission rate using TDMA,
   where each subcarrier in OFDMA has a predetermined bandwidth, and
   two subcarriers per time slot are assigned to one wireless seismic sensor node.

4. The non-transitory computer-readable storage medium of claim 1, wherein
   the survey area is at least 20 $km^2$, and the wireless transmission of the seismic digital data is operated in TV broadcast bands, and the seismic digital data is transmitted directly to the central data receiving device.

5. The non-transitory computer-readable storage medium of claim 1, wherein
   in transmitting the seismic digital data, the seismic digital data recorded per shot is transmitted substantially within 10 seconds,
   a time slot and subcarriers assigned to each wireless seismic sensor node are fixed, and
   frame size, of a data stream divided into frames, of seismic digital data is adjusted based on a signal-to-noise ratio.

6. The non-transitory computer-readable storage medium of claim 5, wherein
   the frame size of the seismic digital data has a payload size of 16 bits.

* * * * *